US009380254B2

(12) United States Patent
Kawaguchi

(10) Patent No.: US 9,380,254 B2
(45) Date of Patent: Jun. 28, 2016

(54) DISPLAY AND ELECTRONIC UNIT

(75) Inventor: Kazunori Kawaguchi, Kanagawa (JP)

(73) Assignee: Sony Corporation (JP)

( * ) Notice: Subject to any disclaimer, the term of this patent is extended or adjusted under 35 U.S.C. 154(b) by 479 days.

(21) Appl. No.: 13/489,672

(22) Filed: Jun. 6, 2012

(65) Prior Publication Data
US 2012/0320507 A1 Dec. 20, 2012

(30) Foreign Application Priority Data
Jun. 15, 2011 (JP) ................................ 2011-133354

(51) Int. Cl.
*H05K 7/00* (2006.01)
*H05K 5/00* (2006.01)
*H04N 5/64* (2006.01)

(52) U.S. Cl.
CPC ....................................... *H04N 5/64* (2013.01)

(58) Field of Classification Search
CPC ........................................... H05K 2201/10159
USPC ............... 361/679.01–679.09, 679.1–679.19, 361/679.21–679.29, 361/679.31–679.45, 361/679.55–679.6, 724–747; 248/917–924, 248/80–88, 155.1–155.5, 166–173, 248/180.1–186.2, 229.1–231.51, 271.4, 248/292.14, 316.1–316.8
See application file for complete search history.

(56) References Cited

U.S. PATENT DOCUMENTS

| 6,532,152 B1* | 3/2003 | White et al. ................. 361/692 |
| 2003/0122992 A1* | 7/2003 | Hayashimoto et al. ......... 349/58 |
| 2005/0117283 A1* | 6/2005 | Lee et al. ...................... 361/681 |
| 2006/0187372 A1* | 8/2006 | Kim et al. ....................... 349/58 |
| 2008/0129920 A1 | 6/2008 | Ito |

FOREIGN PATENT DOCUMENTS

JP 2008-090165 A 4/2008

OTHER PUBLICATIONS

Chinese Office Action for CN Application No. 201210187774.0, dated Feb. 16, 2016.

* cited by examiner

*Primary Examiner* — Jerry Wu
(74) *Attorney, Agent, or Firm* — Lerner, David, Littenberg, Krumholz & Mentlik, LLP

(57) ABSTRACT

A display includes: a display main unit including a display panel; and a back-face covering member including a back-face section and a side-face section, the back-face section being made of a metal plate and disposed on a rear-face side of the display panel to face the display panel, and the side-face section being made of a resin and provided between an end section of the back-face section and an end section of the display main unit.

5 Claims, 10 Drawing Sheets

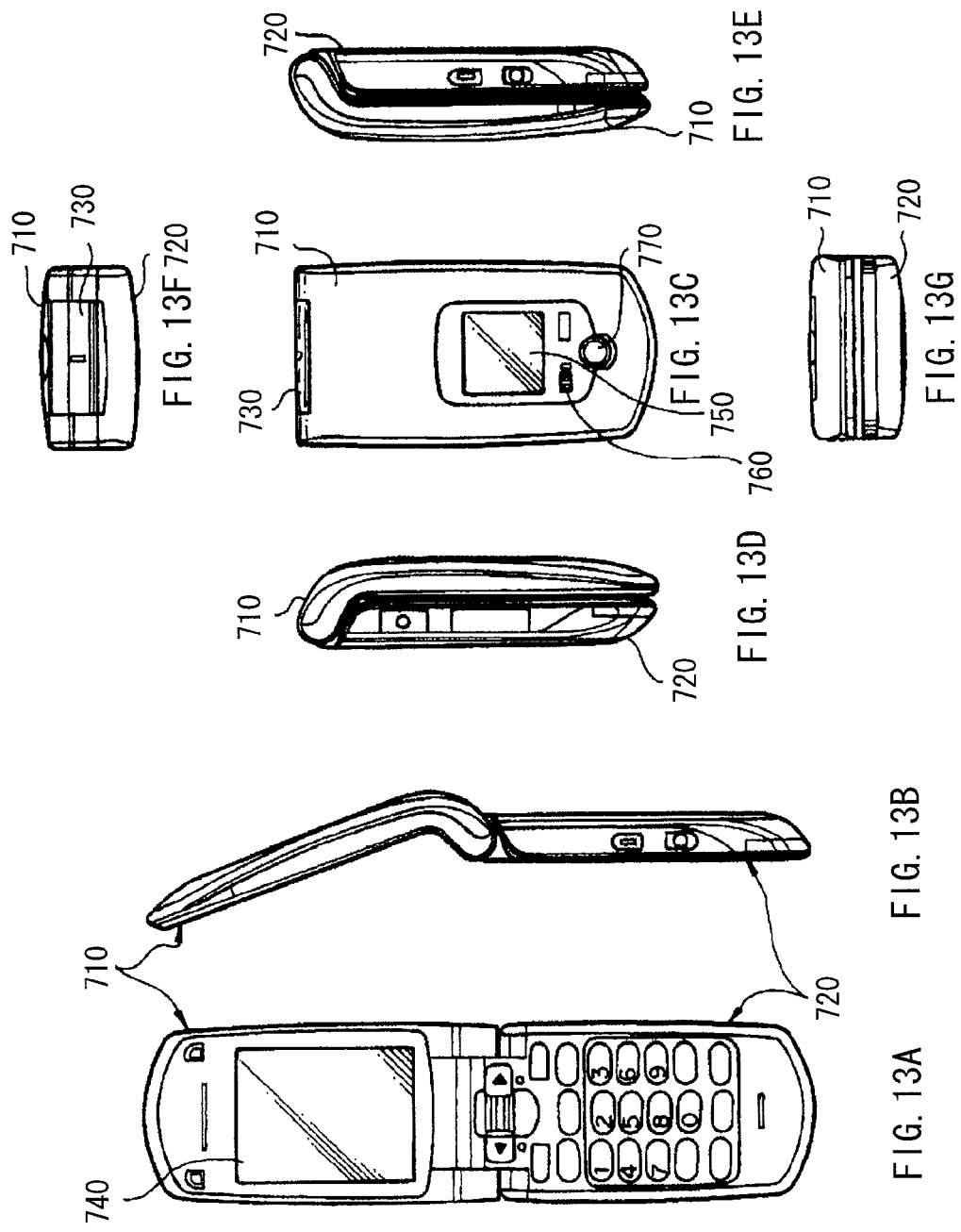

DISPLAY AND ELECTRONIC UNIT

CROSS-REFERENCE TO RELATED APPLICATION

The present application claims priority from Japanese Patent Application No. JP 2011-133354 filed in the Japanese Patent Office on Jun. 15, 2011, the entire content of which is incorporated herein by reference.

BACKGROUND

The disclosure relates to a display such as a television, and an electronic unit provided with this display.

In a display such as a television, a surface (a rear face) opposite to a display surface is covered by a rear housing (a rear cover), as described in Japanese Unexamined Patent Application Publication No. 2008-90165, for example. The rear cover is configured using, for example, a resin, to prevent damage to other components such as a display panel.

SUMMARY

As for a typical rear cover made of resin however, a further reduction in thickness is hard to realize, because it is necessary to determine the smallest thickness considering a forming step and flame resistance, which makes it difficult to render the rear cover thinner than that thickness.

It is desirable to provide a display capable of suppressing damage to other components while being reduced in thickness, and an electronic unit with this display.

A display according to an embodiment of the technology includes: a display main unit including a display panel; and a back-face covering member including a back-face section and a side-face section, the back-face section being made of a metal plate and disposed on a rear-face side of the display panel to face the display panel, and the side-face section being made of a resin and provided between an end section of the back-face section and an end section of the display main unit.

An electronic unit according to an embodiment of the technology includes: a display main unit including a display panel; and a back-face covering member including a back-face section and a side-face section, the back-face section being made of a metal plate and disposed on a rear-face side of the display panel to face the display panel, and the side-face section being made of a resin and provided between an end section of the back-face section and an end section of the display main unit.

In the display according to the embodiment of the technology, or the electronic unit according to the embodiment of the technology, the back-face section of the back-face covering member covers the rear-face side of the display panel, and the back-face section is made of the metal plate. Therefore, a thickness is reduced, as compared with a case where the entire back-face covering member is made of a resin. Further, the side-face section made of the resin is provided between the end section of the back-face section and the end section of the display main unit. Therefore, the metal plate of the back-face section is not directly in contact with the display main unit and thus, other components such as the display panel are less likely to be damaged.

According to the display and the electronic unit in the embodiments of the technology, the back-face covering member includes the back-face section and the side-face section. The back-face section is made of the metal plate and disposed on the rear-face side of the display panel to face the display panel. The side-face section is made of the resin and provided between the end section of the back-face section and the end section of the display main unit. Therefore, it is possible to suppress damage to other components including the display panel, while reducing a thickness.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

Figure 6:
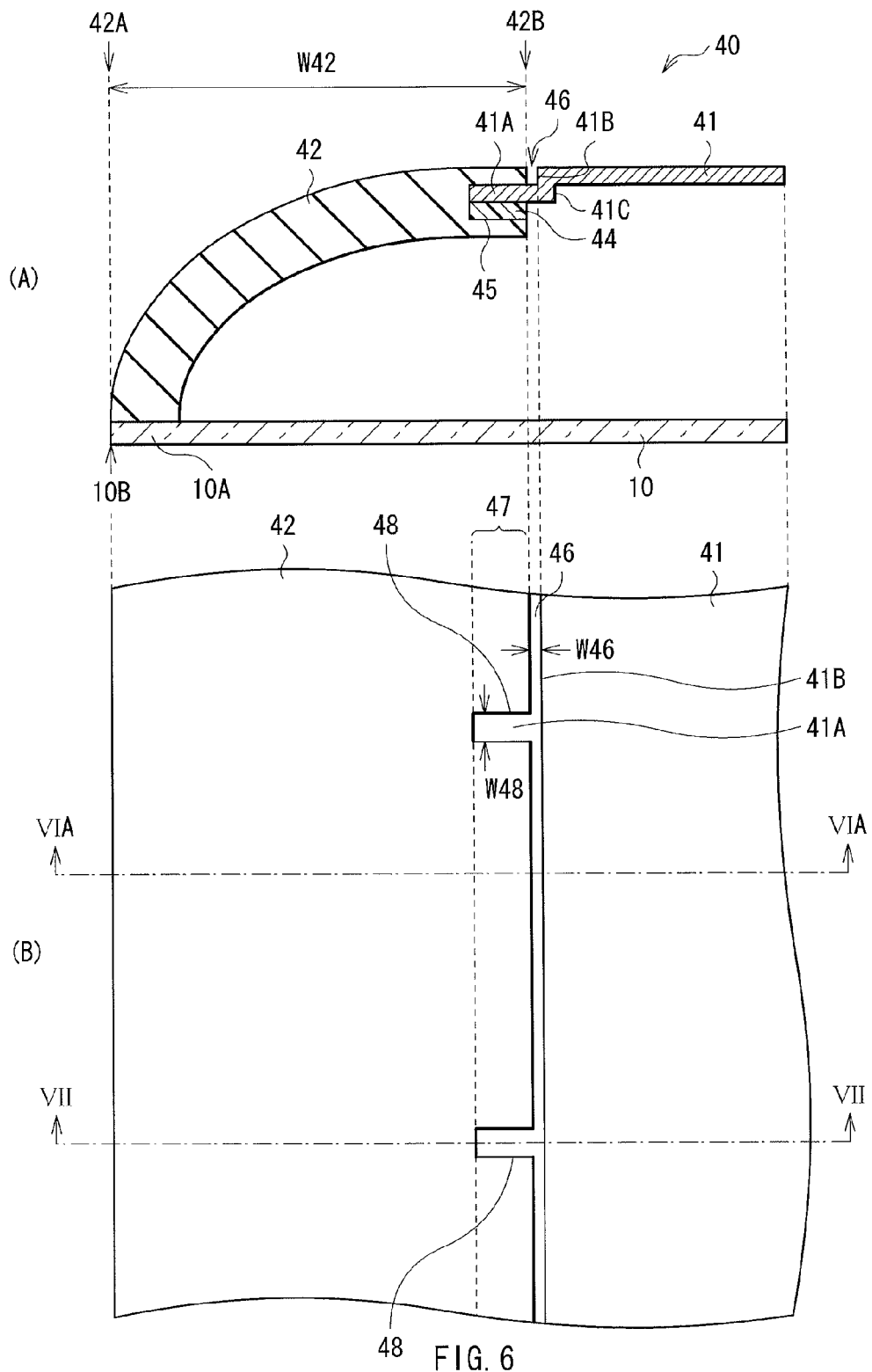

Part (A) and Part (B) of FIG. 6 are diagrams illustrating a display according to a second embodiment of the technology, namely, Part (A) is a cross-sectional diagram illustrating a configuration of a portion in proximity to an end section of each of a rear cover and a front-face plate, and Part (B) is a plan view illustrating a configuration of the rear cover depicted in Part (A) when viewed from an external surface side.

Figure 7:
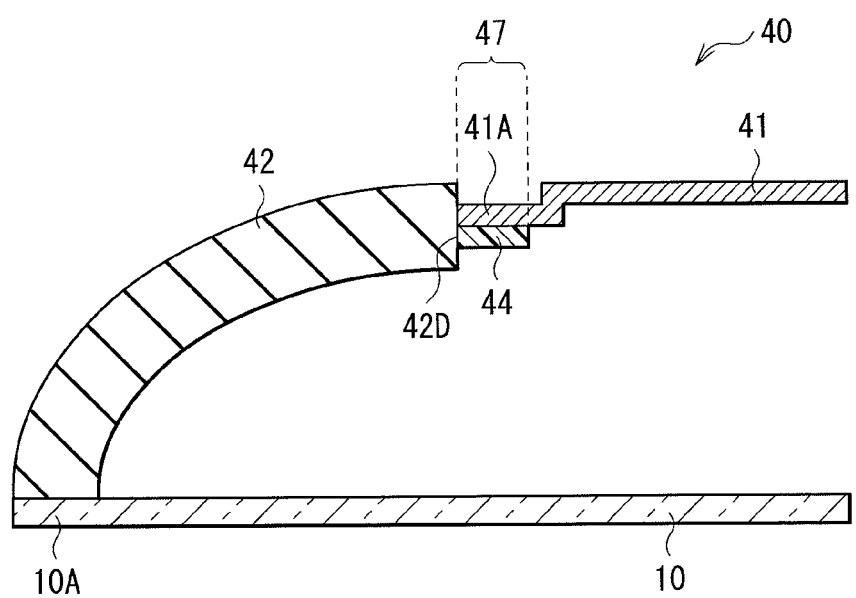

FIG. 7 is a cross-sectional diagram taken along a line VII-VII in Part (B) of FIG. 6.

Figure 8A:
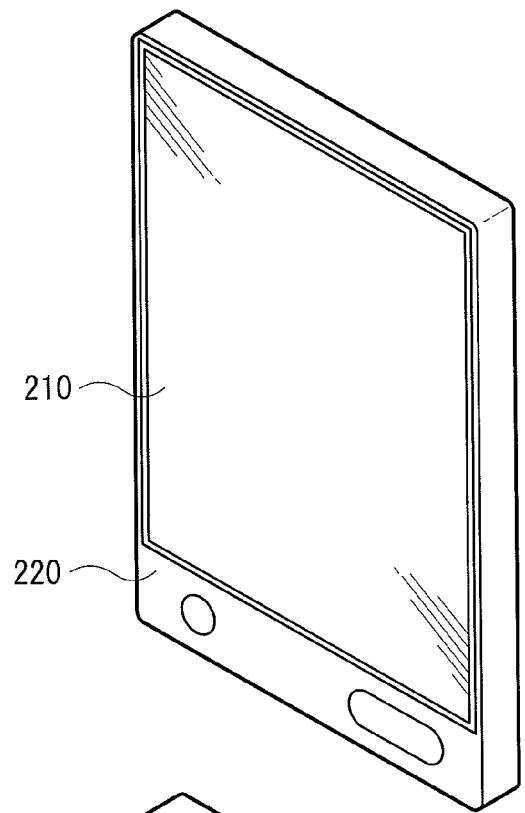
Figure 8B:
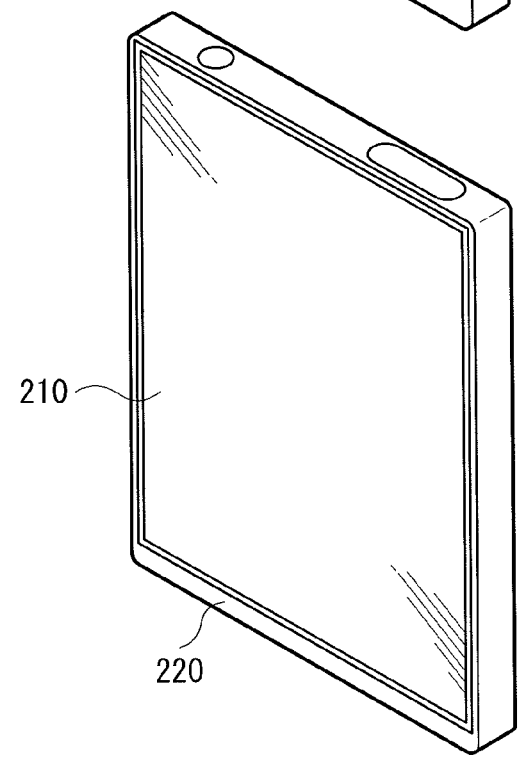

FIGS. 8A and 8B are perspective diagrams each illustrating an appearance of an application example 1 of the display.

Figure 9:
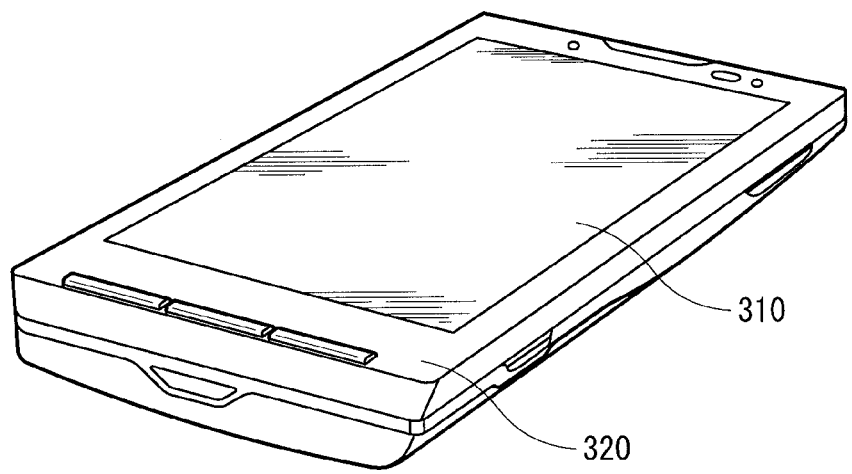

FIG. 9 is a perspective diagram illustrating an appearance of an application example 2.

Figure 10A:
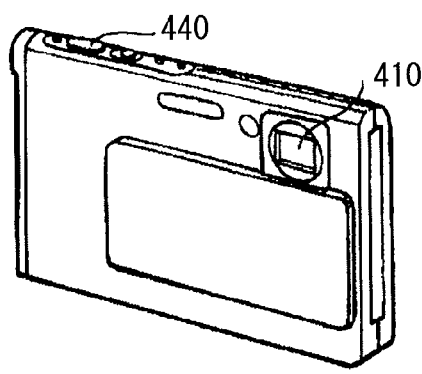
Figure 10B:
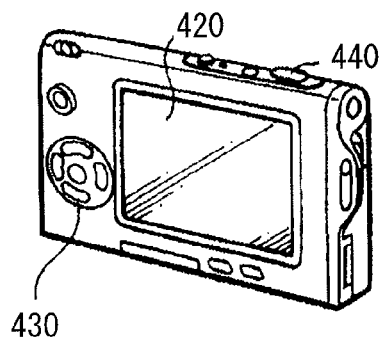

FIGS. 10A and 10B are a perspective diagram illustrating an appearance of an application example 3 when viewed from front, and a perspective diagram illustrating an appearance when viewed from back, respectively.

Figure 11:
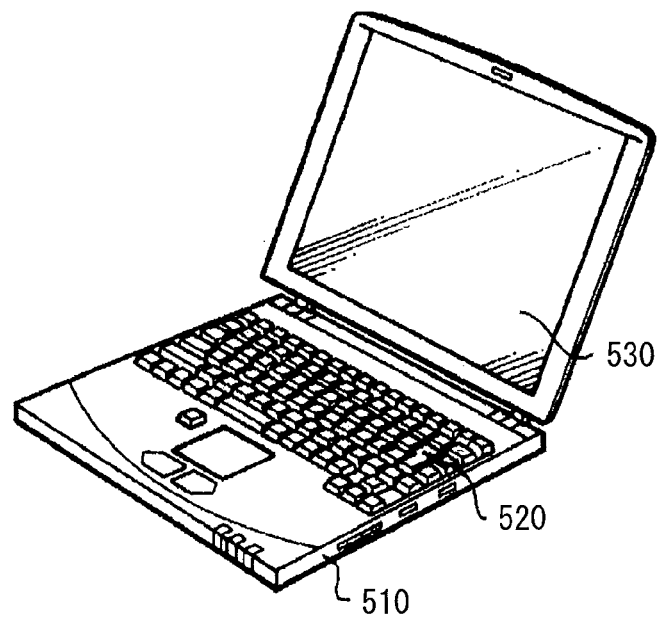

FIG. 11 is a perspective diagram illustrating an appearance of an application example 4.

Figure 12:
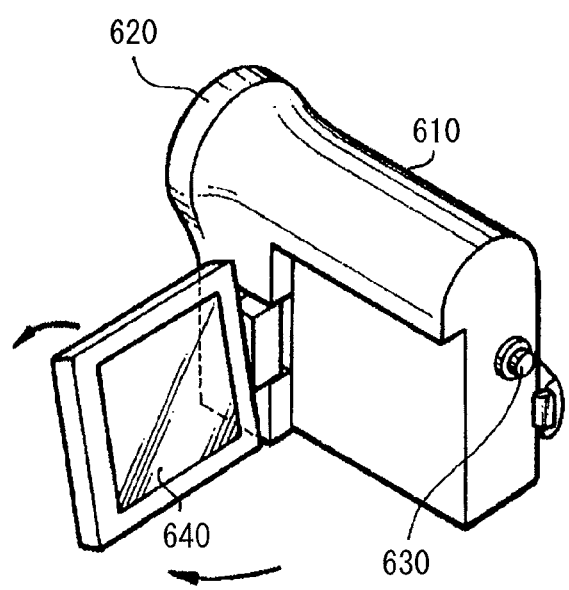

FIG. 12 is a perspective diagram illustrating an appearance of an application example 5.

FIGS. 13A to 13G are views of an application example 5, namely, a front view in an open state, a side view in the open state, a front view in a closed state, a left-side view, a right-side view, a top view, and a bottom view, respectively.

DETAILED DESCRIPTION

Embodiments of the technology will be described below in detail with reference to the drawings. It is to be noted that the description will be provided in the following order.

1. First embodiment (a display: an example in which a rear cover is configured such that a side-face section made of a resin is provided around a back-face section made of a metal plate, and a step section to be mounted with an end section of the back-face section is provided in the side-face section)

2. Second embodiment (a display: an example in which a depression section into which an end section of a back-face section is to be inserted is provided in a side-face section)

3. Application examples

First Embodiment

Figure 1:
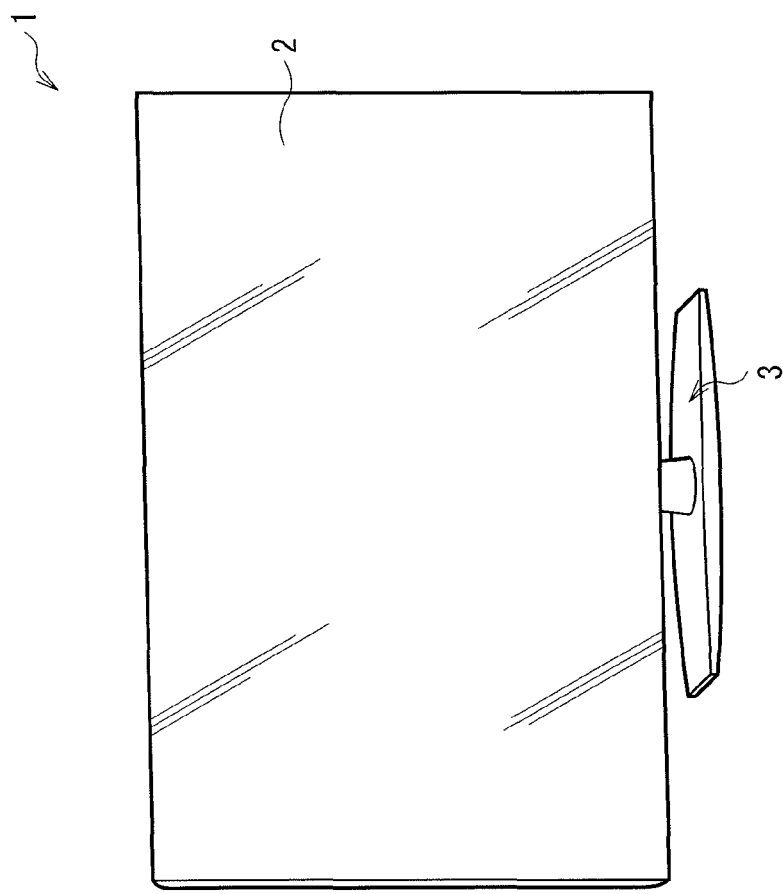
FIG. 1 is a perspective diagram illustrating an appearance of a display according to a first embodiment of the technology.

FIG. 1 illustrates an appearance of a display (a display 1) according to a first embodiment of the technology. The display 1 is used as a thin-screen television, for example, and has a configuration in which a flat main section 2 for image display is supported by a stand 3. It is to be noted that the display 1 is used as a stationary type, in a state in which the stand 3 is attached to the main section 2 and being placed on a horizontal surface such as a floor, a shelf, or a table. Alternatively, the display 1 is used as a wall-hung type, in a state in which the stand 3 is detached from the main section 2.

Figure 2:
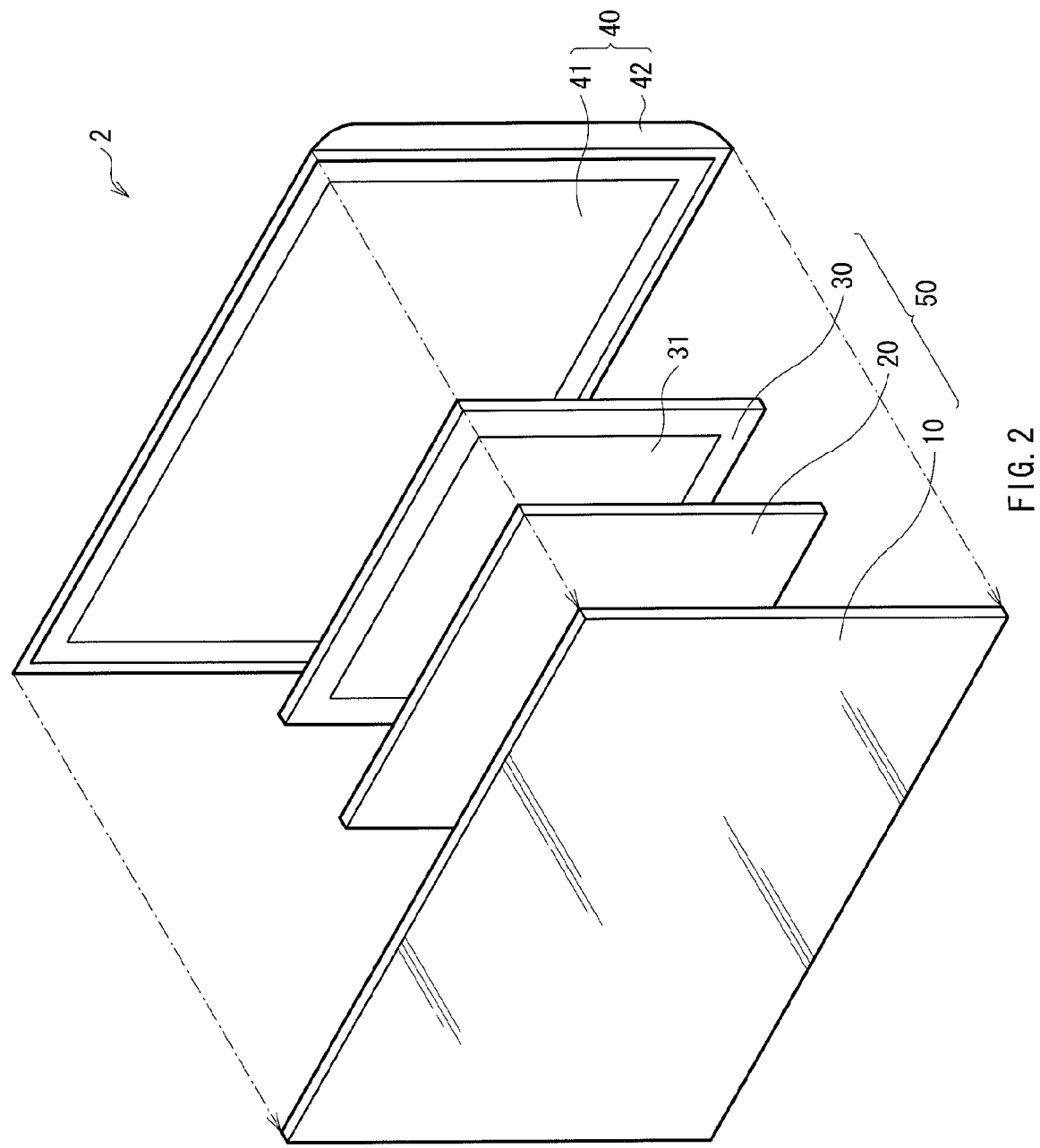
FIG. 2 is an exploded perspective view schematically illustrating a configuration of a main section depicted in FIG. 1.

FIG. 2 illustrates an exploded view of the main section 2 depicted in FIG. 1. The main section 2 includes, for example, a front-face plate 10, an adhesion layer 20, a display panel 30 of a liquid crystal type or the like, and a rear cover (a back-face covering member) 40, sequentially from a front-face side (a viewer side). The front-face plate 10 and the display panel 30 are integrated through adhesion by the adhesion layer 20 across the entire surface, thereby forming a display main unit 50.

The front-face plate 10 is made of a transparent flat glass or the like provided on the display surface 31 side of the display panel 30. It is possible for a user to view an image displayed on the display panel 30, through the front-face plate 10 and the adhesion layer 20. The front-face plate 10 is, for example, larger in size than the display panel 30, and an edge section of the front-face plate 10 protrudes around the display panel 30. To a back side of this protruding section, a fixing frame including a sheet metal and the like is secured, as a component provided to fix the display panel 30 and the rear cover 40, although not illustrated.

The adhesion layer 20 is provided between the front-face plate 10 and the display panel 30, and thereby the front-face plate 10 and the display panel 30 are adhered to each other across the entire surface of the display panel 30. This makes it possible for the user to view an image on the display panel 30, as being displayed on a front face of the front-face plate 10. Without the adhesion layer 20, the user perceives a space between the front face of the front-face plate 10 and the display panel 30, and recognizes an image as being displayed on a front face of the display panel 30. The adhesion layer 20 is made of, for example, an ultraviolet curing resin.

The display panel 30 is provided on a back-face side of the front-face plate 10, and configured using, for example, a liquid crystal display device. It is to be noted that the display panel 30 may be configured using other display devices of plasma, organic electroluminescence (EL), inorganic EL, electrodeposition or electrochromic, and the like, besides the liquid crystal.

Figure 3:
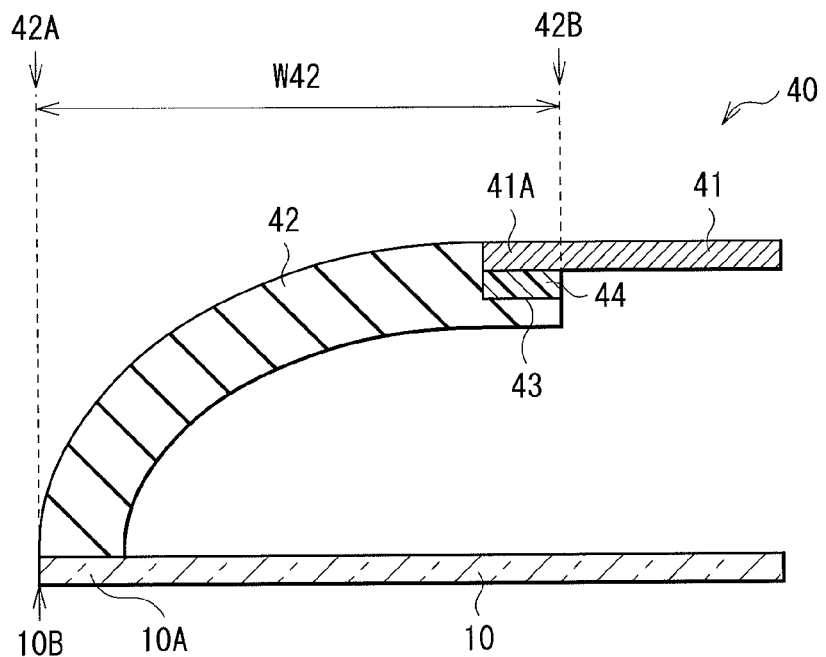
FIG. 3 is a cross-sectional diagram illustrating a configuration of a portion in proximity to an end section of each of a rear cover and a front-face plate depicted in FIG. 2.

The rear cover 40 covers the entire back face of the front-face plate 10, and the display panel 30 is accommodated in an internal space formed between the rear cover 40 and the front-face plate 10. FIG. 3 illustrates a cross-sectional configuration of a part in proximity to an end section of each of the rear cover 40 and the front-face plate 10. The rear cover 40 includes a back-face section 41 and a side-face section 42. The back-face section 41 is disposed on a rear-face side of the display panel 30 to face the display panel 30, and is made of a metal plate. The side-face section 42 is provided between an end section 41A of the back-face section 41 and an end section of the display main unit 50, namely, an end section 10A of the front-face plate 10. The side-face section 42 is made of a resin. In this display 1, it is possible to suppress damage to other components such as the front-face plate 10, while reducing a thickness.

The back-face section 41 forms a flat section of the rear cover 40, and has, for example, a thickness of about 0.5 mm to about 0.4 mm both inclusive. The back-face section 41 is made of a sheet metal such as SGCC (hot-dip galvanized sheet steel). The side-face section 42 forms a curved-surface section of four sides of the rear cover 40, and has, for example, a thickness of about 2.5 mm to about 3.0 mm both inclusive. The side-face section 42 is a rectangular member made of a resin material such as ABS resin (acrylnitrile-butadiene-styrene resin), PS (polystyrene), a material in which PC resin (polycarbonate resin) is added to ABS resin, or a material in which PPE (polyphenylether) is added to PS.

An external visible outline 42A of the side-face section 42 agrees or approximately agrees with a visible outline 10B of the front-face plate 10. An internal visible outline 42B of the side-face section 42 is provided with a step section 43 on which the end section 41A of the back-face section 41 is to be mounted. An external surface of the side-face section 42 and an external surface of the back-face section 41 form a continuous surface or an approximately continuous surface. The end section 41A of the back-face section 41 is fixed to the step section 43 by a primer 44. A width W42 (a distance between the external visible outline 42A and the internal visible outline 42B) of the side-face section 42 is about 30 mm, for example.

The display 1 may be produced as follows, for example.

First, the front-face plate 10 and the display panel configured as described above are prepared. Next, the front-face plate 10 and only a panel main unit (an image display section) of the display panel 30 are adhered to each other by the adhesion layer 20, across the entire surface of the display panel 30. After that, the remaining components (a backlight unit etc.) of the display panel 30 are placed within the fixing frame (not illustrated) of the front-face plate 10. The display panel 30 is then coupled to the fixing frame (not illustrated) of the front-face plate 10 by screw fixing, for example.

Further, the rear cover 40 configured as described above is prepared. A metal plate made of the material and having the thickness described above is formed into a desired shape and size, and thereby the back-face section 41 is formed. Subsequently, the end section 41A of the back-face section 41 is subjected to a treatment of applying the primer 44. The back-face section 41 is then placed in a mold (not illustrated), and the side-face section 42 made of the resin is integrally molded. As a result, the rear cover 40 having the back-face section 41 and the side-face section 42 is formed.

Afterwards, this rear cover 40 is placed over the respective back faces of the front-face plate 10 and the display panel 30, and fixed to the fixing frame (not illustrated) of the front-face plate 10 by screw fixing, for example. The display 1 illustrated in FIG. 1 is thus completed.

Of the rear cover 40, the back-face section 41 covering the rear-face side of the display panel 30 is made of the metal plate, in the display 1. Therefore, the thickness is further reduced than that in a case where the entire rear cover 40 is made of a resin. In addition, the side-face section 42 made of the resin is provided between the end section 41A of the back-face section 41 and the end section of the front-face plate 10. Therefore, the back-face section 41 is not directly in contact with the front-face plate 10 made of a glass plate and thus, the front-face plate 10 is less likely to be damaged.

Figure 4:
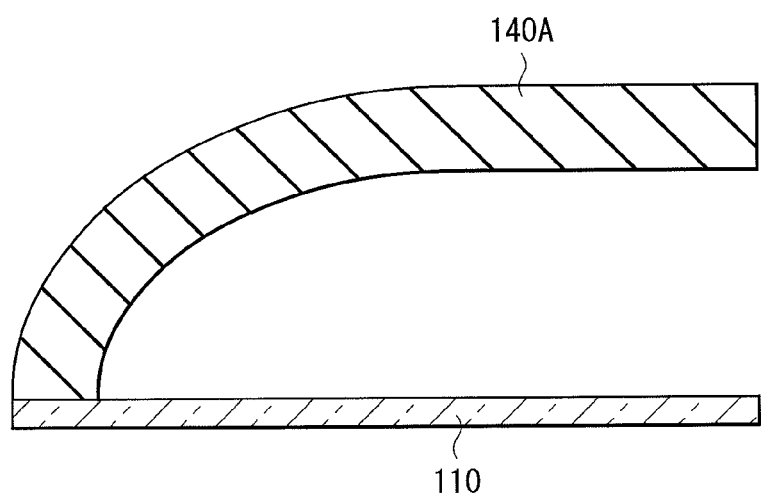
FIG. 4 is a cross-sectional diagram illustrating a configuration of an ordinary display.

In contrast, a currently-available rear cover 140A is entirely made of a resin as illustrated in FIG. 4, for example.

Therefore, it is necessary to determine the smallest thickness considering a forming step and flame resistance, which makes it difficult to render the thickness of the rear cover 140A smaller than that thickness.

Figure 5:
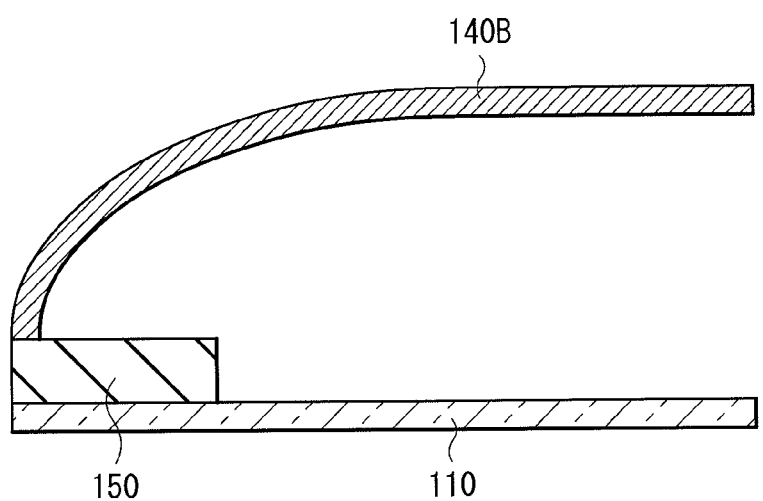
FIG. 5 is a cross-sectional diagram illustrating a case where a rear cover is made of a metal plate.

Meanwhile, it is conceivable that a rear cover 140B may be entirely made of a metal plate to reduce the thickness, as illustrated in FIG. 5, for example. In this case however, it is necessary to provide a resin component 150 called a center cabinet between the rear cover 140B and the front-face plate 110, for the purpose of preventing cracks in the front-face plate 110 made of a glass plate from being produced after assembly. This leads to increases in the number of components, the number of assembly processes, the number of molds, and a molding cost. In the present embodiment, only the back-face section 41, which is flat, of the rear cover 40 is made of the metal plate and thus, it is possible to reduce the number of molds for sheet metal (molds of forming shapes by squeezing), as compared with the case where the entire rear cover 140B is made of the metal plate.

In the present embodiment, the rear cover 40 has the back-face section 41 and the side-face section 42 as described above. The back-face section 41 is made of the metal plate, and disposed on the rear-face side of the display panel 30 to face the display panel 30. The side-face section 42 is made of the resin, and provided between the end section 41A of the back-face section 41 and the end section 10A of the front-face plate 10. Therefore, it is possible to suppress damage to other components such as the front-face plate 10, while reducing the thickness.

Second Embodiment

Part (A) of FIG. 6 illustrates a cross-sectional configuration of a portion in proximity to an end section of each of a rear cover 40 and a front-face plate 10 in a display 1, according to the second embodiment of the technology. In this display 1, a depression section 45 into which an end section 41A of a back-face section 41 is to be inserted is provided in a side-face section 42 of the rear cover 40. Otherwise, the display 1 has a configuration, operation, and effects similar to those of the first embodiment and is manufactured similar to the first embodiment.

In the present embodiment, an internal visible outline 42B of the side-face section 42 has a cross-sectional shape in which three sides of a rectangle is formed by the depression section 45. The end section 41A of the back-face section 41 is inserted into the depression section 45. This makes it possible to suppress opening of a joint part between the back-face section 41 and the side-face section 42, when stress is applied to the rear cover 40

The end section 41A of the back-face section 41 bends at two points: a first bend section 41B in proximity to the internal visible outline 42B of the side-face section 42, and a second bend section 41C in proximity to the depression section 45. An external surface of the side-face section 42 and an external surface of the back-face section 41 form a continuous surface or an approximately continuous surface. It is desirable to provide a space 46 between the internal visible outline 42B of the side-face section 42, and a part between the first bend section 41B and the second bend section 41C of the back-face section 41. This is because it is possible to absorb expansion and shrinkage of the side-face section 42 made of a resin, by using the space 46, when heated or cooled. A width W46 of the space 46 is, for example, desirably about 2 mm, in view of a difference in linear expansion coefficient between resin and metal.

The end section 41A of the back-face section 41 is fixed to the depression section 45 by a primer 44. It is to be noted that although the primer 44 is provided only on an undersurface of the end section 41A here, the primer 44 may be provided on both of the undersurface and a top surface of the end section 41A. A width W42 (a distance between an external visible outline 42A and the internal visible outline 42B) of the side-face section 42 is about 30 mm, for example.

Part (B) of FIG. 6 illustrates a plane configuration of the rear cover 40 depicted in Part (A) of FIG. 6, when viewed from the external surface side. FIG. 7 illustrates a cross-sectional configuration taken along a line VII-VII in Part (B) of FIG. 6. It is desirable that the side-face section 42 have cut 48 in a region (an overlap region) 47 where the side-face section 42 and the end section 41A of the back-face section 41 overlap. This makes it possible to prevent cracks, which are produced due to a difference in linear expansion coefficient between the front-face plate 10 made of glass and the side-face section 42 made of the resin, when heated or cooled.

It is desirable to provide the cut 48 at a position of a weld line that is used when the back-face section 41 and the side-face section 42 are integrally molded in a production process. The weld line is an intermediate position between adjacent two resin-injection points, namely, a position where resins injected from the adjacent two points are combined to be integral. In the overlap region 47, two different kinds of members, namely, the back-face section 41 made of a metal plate and the side-face section 42 made of the resin come into contact with each other. Since the resin has a greater linear expansion coefficient, the resin might be easily damaged in the weld line when heated or cooled. Providing the cut 48 at the position of the weld line beforehand makes it possible to absorb expansion and shrinkage of the side-face section 42 made of the resin by using the cut 48, when heated or cooled. Thus, it is possible to suppress damage to the rear cover 40 and further, cracks in the front-face plate 10 made of the glass may be prevented.

It is desirable to provide the cuts 48 in an entire width direction of the overlap region 47, as illustrated in the cross section in FIG. 7. A width W48 of the cut 48 is set, desirably, to an extent that the mold is not damaged, e.g. about 2 mm.

It is to be noted that each of the cuts 48 may be shaped like a straight line diagonal with respect to the internal visible outline 42B, other than a straight line orthogonal to the internal visible outline 42B as illustrated in Part (B) of FIG. 6. Alternatively, the cut 48 may be in any of other shapes including a zigzag, a curve, and a wavy shape.

In this display 1, the depression section 45 into with the end section 41A of the back-face section 41 is to be inserted is provided in the side-face section 42 of the rear cover 40. Therefore, it is possible to suppress opening of a joint part between the back-face section 41 and the side-face section 42, when stress is applied to the rear cover 40.

In addition, the side-face section 42 includes cuts 48 in the overlap region 47 where the side-face section 42 and the end section 41A of the back-face section 41 overlap. Therefore, it is possible to prevent cracks, which are produced due to a difference in linear expansion coefficient between the front-face plate 10 made of the glass and the side-face section 42 made of the resin, when heated or cooled.

APPLICATION EXAMPLES

Next, application examples of the display 1 will be described with reference to FIG. 8 to FIG. 13G. The display 1 is applicable to electronic units in all fields, which display externally-input image signals or internally-generated image signals as still or moving images. The electronic units include television receivers, digital cameras, laptop computers, portable terminals such as portable telephones, video cameras, and the like.

Application Example 1

FIGS. 8A and 8B each illustrate an appearance of an electronic book to which the display 1 is applied. This electronic book includes, for example, a display section 210 and a non-display section 220, and the display section 210 is configured using the display 1.

Application Example 2

FIG. 9 illustrates an appearance of a smartphone to which the display 1 is applied. This smartphone includes, for example, a display section 310 and a non-display section 320, and the display section 310 is configured using the display 1.

Application Example 3

FIGS. 10A and 10B each illustrate an appearance of a digital camera to which the display 1 is applied. This digital camera includes, for example, a flash emitting section 410, a display section 420, a menu switch 430, and a shutter button 440. The display section 420 is configured using the display 1.

Application Example 4

FIG. 11 illustrates an appearance of a laptop computer to which the display 1 is applied. This laptop computer includes, for example, a main section 510, a keyboard 520 to enter characters and the like, and a display section 530 displaying an image. The display section 530 is configured using the display 1.

Application Example 5

FIG. 12 illustrates an appearance of a video camera to which the display 1 is applied. This video camera includes, for example, a main section 610, a lens 620 disposed on a front face of this main section 610 to shoot an image of a subject, a start/stop switch 630 in shooting, and a display section 640. The display section 640 is configured using the display 1.

Application Example 6

FIGS. 13A to 13G each illustrate an appearance of a portable telephone to which the display 1 is applied. This portable telephone is, for example, a unit in which an upper housing 710 and a lower housing 720 are connected by a coupling section (a hinge section) 730, and includes a display 740, a sub-display 750, a picture light 760, and a camera 770. The display 740 or the sub-display 750 is configured using the display 1.

The technology has been described using the embodiments, but is not limited to these embodiments, and may be variously modified. For example, each of the embodiments has been described for the case where the front-face plate 10 is larger in size than the display panel 30. However, the front-face plate 10 and the display panel 30 may be equal in size. In this case, the side-face section 42 of the rear cover 40 is provided between the end section 41A of the back-face section 41 and the end section of the display main unit 50, namely, an end section of the display panel 30. This makes it possible to suppress damage to other components including the display panel 30.

Further, for example, each of the embodiments has been described for the case where the display main unit 50 has the configuration in which the front-face plate 10 is adhered to the display surface 31 side of the display panel 30 with the adhesion layer 20. However, the display main unit 50 may be configured using only the display panel 30, and the front-face plate 10 and the adhesion layer 20 may not be provided.

Furthermore, for instance, the material and the thickness of each layer described in the embodiments are not limited, and other materials and thicknesses may be employed.

Moreover, each of the embodiments has been described using the configuration of the display (television) specifically, for example. However, it is not necessary to provide all of the elements, or other components may be further provided.

It is possible to achieve at least the following configurations from the above-described exemplary embodiment of the technology.

(1) A display including:
a display main unit including a display panel; and
a back-face covering member including a back-face section and a side-face section, the back-face section being made of a metal plate and disposed on a rear-face side of the display panel to face the display panel, and the side-face section being made of a resin and provided between an end section of the back-face section and an end section of the display main unit.

(2) The display according to (1), wherein the side-face section includes a step section on which the end section of the back-face section is mounted.

(3) The display according to (1), wherein the side-face section includes a depression section into which the end section of the back-face section is inserted.

(4) The display according to (3), wherein the side-face section includes a cut in a region where the side-face section and the end section of the back-face section overlap.

(5) The display according to any one of (1) to (4), wherein the display main unit includes the display panel, and a front-face plate provided on a display surface side of the display panel.

(6) The display according to (5), wherein the front-face plate has a size equal to or larger than a size of the display panel.

(7) An electronic unit with a display, the display including:
a display main unit including a display panel; and
a back-face covering member including a back-face section and a side-face section, the back-face section being made of a metal plate and disposed on a rear-face side of the display panel to face the display panel, and the side-face section being made of a resin and provided between an end section of the back-face section and an end section of the display main unit.

It should be understood by those skilled in the art that various modifications, combinations, sub-combinations and alterations may occur depending on design requirements and other factors insofar as they are within the scope of the appended claims or the equivalents thereof.

What is claimed is:
1. A display comprising:
a display main unit having a display panel and a front-face plate comprising a front surface, a plurality of side walls and a back-side portion which is right next to and substantially perpendicular to the side walls, said front face plate provided on a display surface side of the display panel; and a rear cover including a back-face section and a side-face section which are integrally formed together to form a single piece rear cover, the back-face section being a flat-shaped plate made of metal and the side-face section being made of a resin such that in the rear cover only the flat-shaped back-face section is made of the metal, an end section of the side-face section of the single piece rear cover being attached to the back-side portion of the front face plate of the display main unit so that (i) an inner surface of the back-face section faces a rear-face side of the display panel, (ii) the display panel is arranged within an internal space formed between an inner portion of the rear cover and the back-side portion of the front-face plate, and (iii) an outside surface of the-single piece rear cover and the front surface and the side walls of front face plate form an entire external surface of the display.

2. An electronic unit with a display, the display comprising:

a display main unit having a display panel and a front-face plate, said front face plate provided on a display surface side of the display panel; and a rear cover including a back-face section and a side-face section which are integrally formed together to form a single piece rear cover, the back-face section being a flat-shaped plate made of metal and the side-face section being made of a resin such that in the rear cover only the flat-shaped back-face section is made of the metal, an end section of the side-face section of the single piece rear cover being directly attached to a back-side portion of the front face plate of the display main unit so that (i) an inner surface of the back-face section faces a rear-face side of the display panel, (ii) the display panel is arranged within an internal space formed between an inner portion of the rear cover and the back-side portion of the front-face plate, and (iii) an outside surface of the single piece rear cover and an outside surface of front face plate form an entire external rear surface of the display; and the back-face section of the single piece rear cover has a thickness value in a range from 0.4 mm to 0.5 milli-meters and the side-face section of the single piece rear cover has a thickness value in a range from 2.5 mm to 3. milli-meters.

3. The display according to claim 1, wherein the side-face section includes a step section on which an end section of the back-face section is mounted.

4. The display according to claim 1, wherein the side-face section includes a depression section into which an end section of the back-face section is inserted.

5. The display according to claim 4, wherein the side-face section includes a cut in a region where the side-face section and the end section of the back-face section overlap.

* * * * *